Feb. 28, 1967         J. R. PALMER ETAL         3,306,419
              SALT HARVESTING APPARATUS AND METHOD
Original Filed April 30, 1963                3 Sheets-Sheet 3

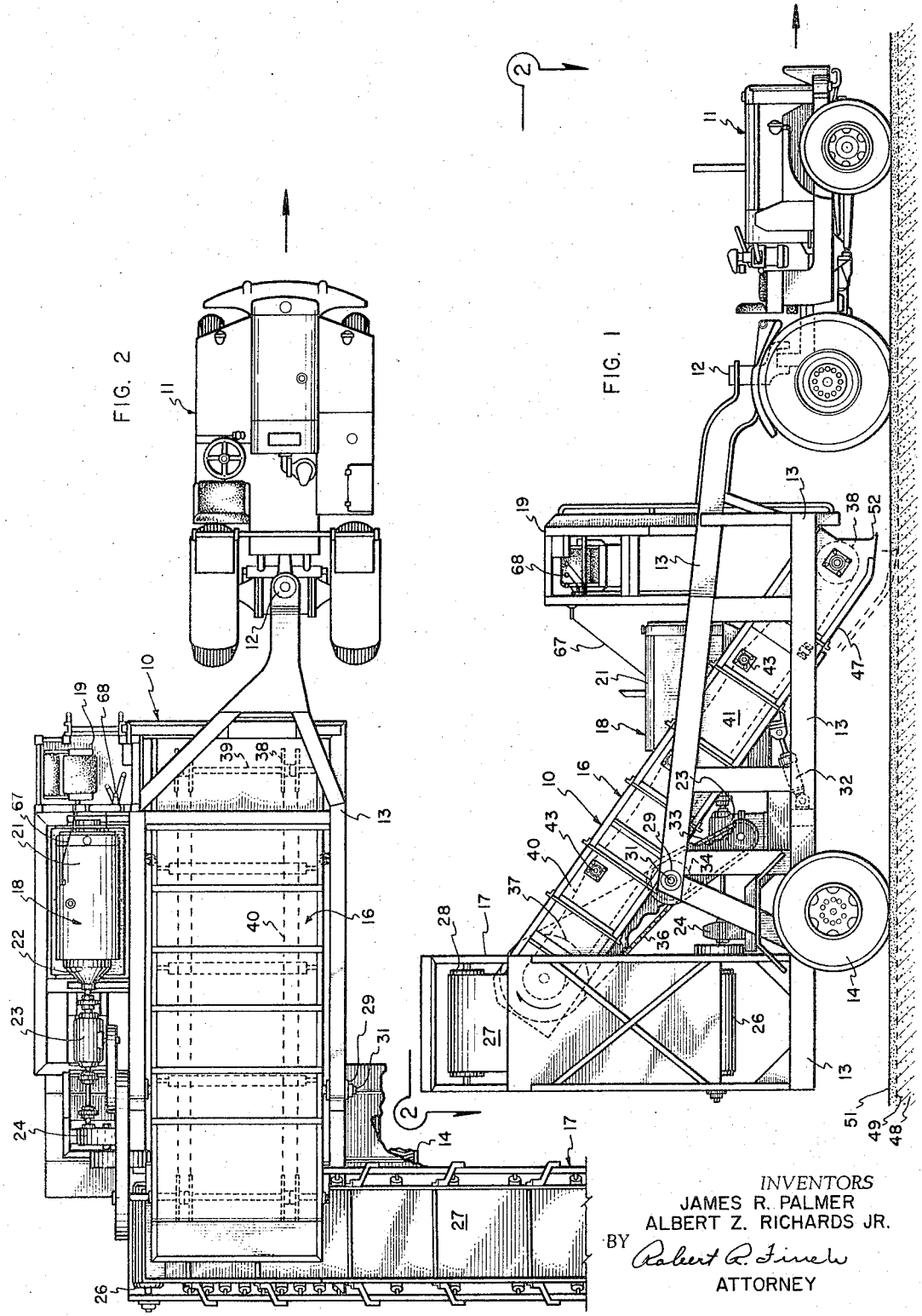

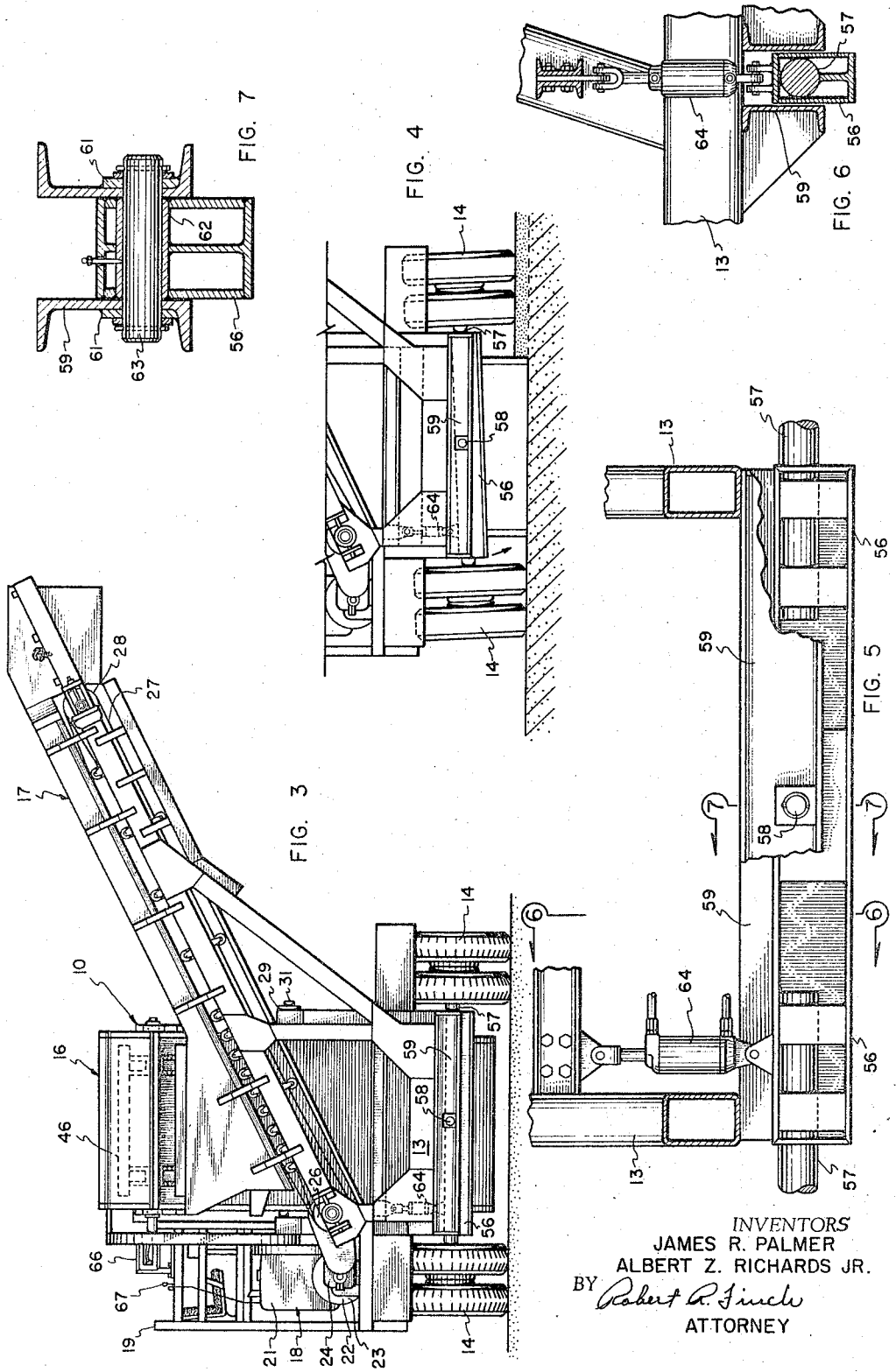

INVENTORS
JAMES R. PALMER
ALBERT Z. RICHARDS JR.
BY *Robert R. Finch*
ATTORNEY

United States Patent Office 3,306,419
Patented Feb. 28, 1967

3,306,419
SALT HARVESTING APPARATUS AND METHOD
James R. Palmer, P.O. Box 475, Grantsville, Utah
84029, and Albert Z. Richards, Jr., 2022 Imperial St.,
Salt Lake City, Utah 84105
Continuation of abandoned application Ser. No. 276,848,
Apr. 30, 1963. This application June 13, 1966, Ser.
No. 562,418
2 Claims. (Cl. 198—7)

This invention relates to salt production and in particular to improved ways and means for harvesting salt yielded from brine in solar evaporation processes.

This application is a continuation of our co-pending application Serial No. 276,848, filed April 30, 1963, now abandoned, for Salt Harvesting Apparatus and Method.

Salt production by solar evaporation is practiced throughout the world wherever there are favorable climatic conditions combined with a readily accessible source of brine. In the United States, the industry is confined chiefly to the States of Utah and California. Mexico is another large producer in North America.

In all solar evaporation processes, brine is repeatedly flooded onto production plains and evaporated. This is repeated over long periods until a sufficient depth of salt cake is built up to enable harvesting operations.

Heretofore the actual harvesting has commonly employed the steps of plowing to disrupt or loosen the formed salt, scraping it into windows and finally loading and hauling the salt. In carrying out the process there have heretofore been employed many different types of equipment to effect the separate steps of plowing, scraping and loading. As a result, the cost of salt harvesting is relatively high in terms of equipment cost, expenses of operation, maintenance and labor.

The present invention is directed to ways and means enabling the harvesting of salt from solar evaporation beds in a single step process which eliminates plowing and scraping as such and instead harvests the salt directly from the bed and loads it immediately onto transport vehicles.

It is the primary object of the invention to provide an improved salt harvesting combine apparatus for removing salt cake directly from the beds on which it is formed without any preplowing or scraping.

A further object is the provision of such apparatus operable at varying depths thereby providing flexibility to accommodate different local conditions and eliminate any requirement for absolute precision as to depth of salt to be harvested.

We have further discovered that by proper preparation of the evaporating beds the capacity and overall efficiency of our new apparatus is magnified many fold to the end that only one, or at the most two, men can harvest and load hundreds of tons of salt per hour.

It is, therefore, another prime object of the invention to provide an improved process for preparing salt for harvest and for carrying out the harvest of salt so prepared.

In brief, the invention contemplates preparation of an operating bed by first building up a supporting base of evaporated salt. This is accomplished by repeated flooding and evaporation until a depth of up to 16 inches is reached. The bed is thus formed as a single thick homogeneous or monolithic cake of great strength serving as a permanent base for further operation.

There is then formed a split or cleavage plane on the surface of the base. This is done by reflooding the base with brine, evaporating it to a slush short of dryness then dragging or scarifying the slush to break up the monolithic structure that would otherwise bind to the base and instead render it as a layer of separate crystals after further drying. Brine is repeatedly flooded onto the bed, over the top of the split or cleavage layer, and evaporated until the desired depth of product salt is obtained for harvesting. The harvestable cake is built up to a depth of from 2 to 12 inches but for most economic operation is kept to a range of from 4 to 8 inches.

Harvesting is accomplished in accordance with the invention by separating product salt from the base at the split or cleavage plane. This is done by our apparatus which operates to lift the product in slabs directly onto a conveyor which effects initial breaking of the slab and in turn deposits the broken or crumbled slab directly into the transport vehicle.

As previously noted, the apparatus is of particular construction enabling it to effect proper separation of product salt from the underlying base. The general nature of the apparatus as well as its critical features of construction and its relation to the process will be readily understood by reference to the accompanying drawings and the description thereof, which are offered by way of illustration rather than limitation of the invention, the scope of which is defined by the appended claims.

In the drawings:

FIG. 1 is a side elevational view of apparatus embodying the invention, dotted lines being employed to show certain interior parts.

FIG. 2 is a top plan view of the apparatus of FIG. 1 taken as looking in the direction of arrows 2 of FIG. 1, certain internal parts being shown in dotted lines for purposes of clarity.

FIG. 3 is a rear elevational view of the structure of FIGS. 1 and 2, dotted lines being employed to show certain internal parts.

FIG. 4 is a partial view of the apparatus of FIG. 3 but showing the apparatus in an operating position.

FIG. 5 is an enlarged partial view of the rear axle and leveling assembly of the apparatus, certain parts being shown in section.

FIG. 6 is a sectional view taken in the plane of line 6—6 of FIG. 5.

FIG. 7 is a sectional view taken in the plane of arrows 7—7 of FIG. 5.

Figure 9:
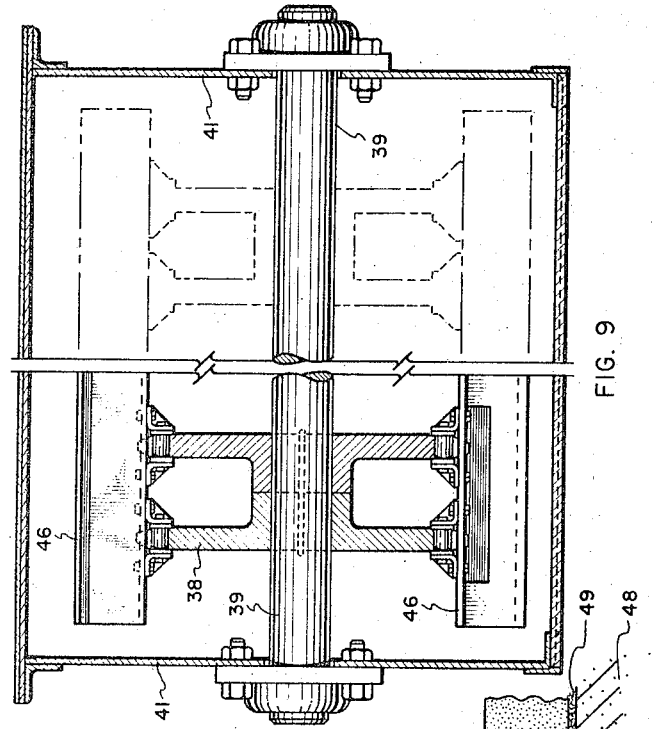
FIG. 9 is an end view of the structure of FIG. 9 partly in elevation and partly in section. The view is taken as looking in the direction of arrows 9 of FIG. 8 but shows both sides of the apparatus.

As illustrated in FIGS. 1 and 2, the apparatus comprises a harvester, generally designated 10, pulled by a suitable tractor 11 to which the harvester is attached by a drawbar 12.

The harvester includes a main frame 13 which, together with wheels 14, forms a base operatively supporting the harvester components.

Briefly, the harvester comprises a combined splitting, collecting and breaking section 16 (herein called the collector), pivotally mounted to the frame, a take-away conveyor 17 rigidly mounted on the frame, a power section 18 and a control station 19 which may, if desired, be arranged as a remote station carried by the tractor rather than on the harvester.

The power section includes a suitable engine 21, hydraulic clutch mechanism 22, a first speed reducer 23 from which both the collector 16 and a second gear reducer 24 are driven. The second gear reducer in turn drives the take-away conveyor 17 through its lower end pulley 26 over which is trained, in usual fashion, a conveyor belt 27 extending between it and an idler 28 at the discharge end of the conveyor.

The function of the take-away conveyor is simply to accept salt delivered to it by the collector and in turn deliver it to a truck or other vehicle (not shown) moving alongside the apparatus. Since operation of the take-away conveyor is conventional, further explanation thereof is unnecessary.

As noted, the collector 16 is pivotally mounted to the frame 13. This is accomplished by the pivotal connections 29 on opposite sides of the frame 13 in which is journalled a shaft 31 secured transversely to the collector. As best shown in FIG. 1, this arrangement permits raising and lowering of the lower forward end of the collector.

Controlled pivoting of the collector into and out of desired operative position is effected by suitable motor means here shown as a hydraulic ram 32 connected at one end to the main frame and at the other end to the collector 16 at a point spaced from the pivot.

Driving of the collector in all positions is done from the previously mentioned speed reducer 23 which operates and drives a first chain 33 that in turn drives a sprocket 34 mounted co-axially with sprocket 34 and in turn drives a second chain 36 which completes the connection to the main drive sprocket 37 at the upper end of the collector. It will be seen, then, that sprocket 34 serves as a transition member permitting the collector to be driven in all positions. This is important because it enables the collector to efficiently harvest various depths of product salt.

Figure 8:
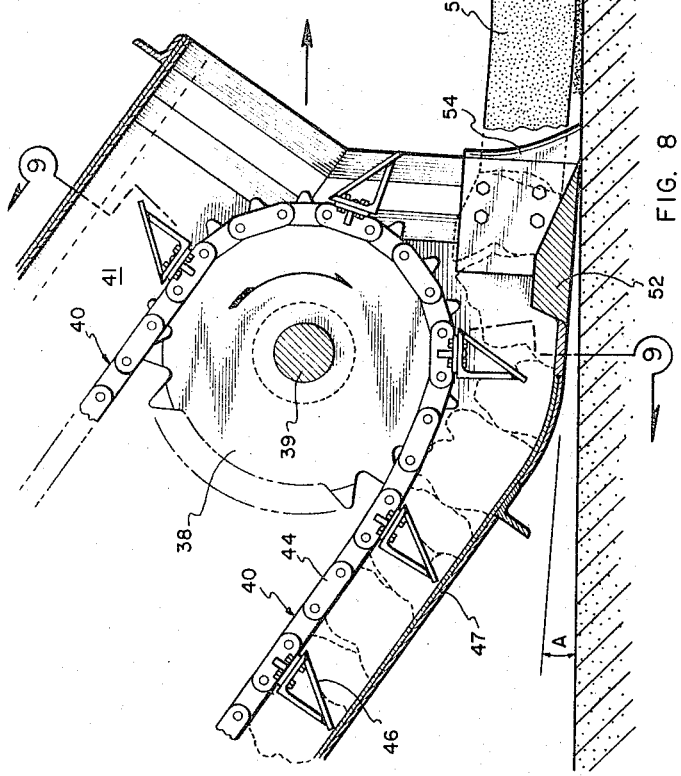
FIG. 8 is an enlarged view showing in side section the cleavage blade and initial conveyor part of the apparatus.

The collector is further provided with an idler sprocket arrangement at its lower forward end. This is best shown in FIGS. 1, 8 and 9 where it will be seen that the arrangement includes paired idler sprockets 38 mounted on a shaft 39 extending transversely of the collector between its sidewalls 41.

Trained about the drive and idler sprockets is a conveyor structure 40 (conveniently called belt) of particular design. The upper flight of this belt is supported on suitable guide rolls 43.

The conveyor belt 40 is actually an endless drag formed from parallel link chains 44 connected together by a plurality of transversely mounted spaced-apart outwardly extending rakes 46. As hereinafter explained, these rakes break cake entering the collector and convey or drag it away to discharge onto the take-away conveyor. Hence, as most clearly shown in FIG. 8, it is important that the rakes move closely adjacent the bottom 47 of the collector to effect initial breaking of the cake as it passes over the elevated rear portion of the wedge-shaped cleavage blade 52 as well as to insure substantially complete removal of all salt as it enters the collector to eliminate any barrier to entering salt.

As heretofore explained, the apparatus has been specifically designed to operate most efficiently on salt beds prepared in accordance with a particular process which results in a base 48 (FIGS. 1, 4 and 8) formed as a monolithic salt structure. The base is overlain by a split or discontinuous loose salt layer 49 in turn overlain by a monolithic layer 51 of product salt.

In order to harvest the product salt it is necessary that it be separated from the base for entry into the collector in slab form. This is the most critical single step of the whole operation and requires that the apparatus be provided with a wedge-shaped splitting edge or blade 52 mounted with its thin cutting edge as the leading lower edge of the entire collector with its thickened rear portion spaced above the bottom of the collector. The blade is mounted to be guided by the collector into a critical angle of entry to the split 49 between the product salt and the base. This angle is measured as the angle A between the forward edge 53 of the splitter blade 52. It is essential that the smooth edge 53 make only line contact with the base and that the angle A not be less than about 2°. If the angle is less than this, the frictional forces rise sharply and, even more important, the splitter tends to plane or rise toward the product cake which resists its entry and, because of its inherent strength, piles up in front of the collector rather than entering it smoothly. on the other hand, this angle A cannot exceed a maximum of about 16° because above this the edge digs into the base and skips in washboard fashion. This is highly undesirable because it prevents smooth salt pickup and also causes product salt to be displaced laterally to fall on the already cleaned base out of range of the collector. If this occurs, the displaced salt can only be harvested by clean up operations which are uneconomical.

As illustrated in FIG. 8, cake slabs are lifted by the wedge shaped blade 51 and as the collector moves forward, they are elevated by the thickened rear portion of the blade. As the slabs pass over the thickened rear portion the rakes 46 strike the cake thus breaking it downward over the space provided at the rear of the cleavage blade. This action insures initial breaking of the cake.

In order to insure clean cutting of the product salt side cutters 54 are mounted adjacent the opposite ends of the blade 52. These also serve to laterally confine salt as it enters the collector.

It is necessary for proper operation that the collector and its associated splitter blade be maintained substantially level during operation to insure proper guiding of the blade into the cleavage plane. At the same time, it is necessary that the drawbar be arranged so the towing vehicle can apply to the harvester a properly centered towing or pulling force. There is the further requirement that the collector and blade be between the wheels rather than offset. Moreover, the edge between the cleaned base after harvesting and the material yet to be harvested should not be disturbed by any of the equipment.

These requirements are met by our apparatus which is provided with a leveling arrangement enabling the harvester frame and all operative parts of the harvester to be leveled independently of the wheels. That is to say, the axle carrying member 56 and the axles 57 between the wheels 14 of the harvester can be tilted (FIG. 4) due to different heights of the surfaces on which they ride yet the harvester itself will be level and parallel to the surface of the salt bed.

The leveling arrangement is illustrated best in FIGS. 3–7 which shows that the frame 13 is tiltably connected to the transverse axle member 56 by a pivotal joint 58 between the axle member and a lower transverse frame member 59 of the frame. The pivotal joint (FIG. 7) comprises bearing members 61 on the transverse frame member, a bushing 62 of the axle member and a shaft 63 journalled in the bearings and bushing.

A motor, here shown as a hydraulic ram 64, interconnects the frame and the axle member at a location spaced from the pivot. Actuation of the ram (FIG. 10) effects relative movement between the frame and axle. A level indicator 66 is conveniently provided at the operator control station 19.

All controls for the harvester are, in the embodiment shown, located at the control station 19. In this connection, it is to be noted that the controls can be mounted on the drawbar adjacent the tractor or even on the tractor itself.

Figure 10:
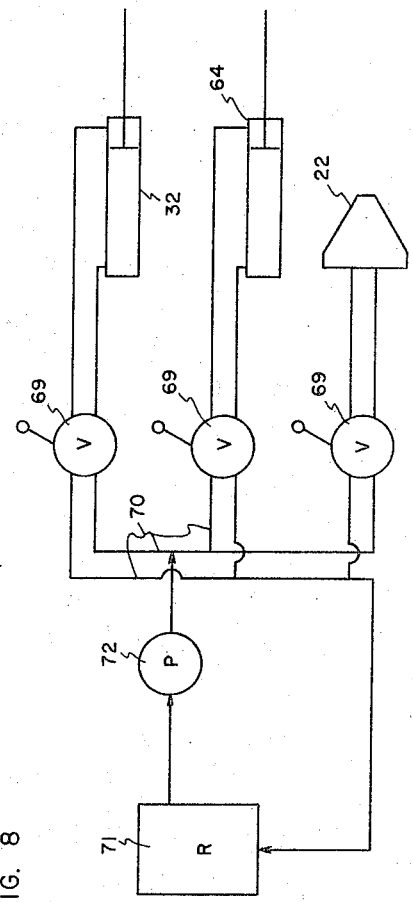
FIG. 10 is a line diagram of a hydraulic control system adapted for use on the apparatus.

In brief, the controls include the engine control station 67, for operating the engine 21, and the hydraulic control station 68 for operating the clutch 22, elevating ram 32 and leveling ram 64. The engine control system utilizes conventional linkages. Similarly, as shown in FIG. 10, the hydraulic system is relatively straight forward, comprising valves 69 which may be separate or combined as shown in FIGS. 1 and 2. The valves are connected by suitable conduits 70 to the clutch 22, elevating ram 32 and leveling ram 64. As usual reservoir 71 and pump 72 are provided. Obviously, the valves and handles may be combined into a single unit such as shown in FIGS. 1 and 2.

OPERATION

As previously noted, the bed is specially prepared to provide a strong base 48 having at least at its surfaec a monolithic salt structure overlain by a split or cleavage plane 49 formed as a heterogeneous layer of salt crystals. And overlying the split there is formed by evaporation a monolithic layer of product salt that probably merges into the upper portion of the split but is not bound to the base.

The harvester is brought into position and the collector lowered to bring the splitting blade into position between the base and product, the angle (A) between the bottom of the blade and the base surface being controlled to be at least about 2° but not more than about 16°. As hereinabove explained, an angle of less than 2° causes the assembly to plane and increases friction while an angle in excess of 16° causes intermittent digging into the base which in turn results in blade jumping as it would on a washboard type surface.

As the harvester moves forward its speed is adjusted so that the linear velocity of the drag blades exceeds the forward speed of the harvester by a significant factor. In fact, it has been found desirable to maintain drag speed at least 50% higher than the forward speed of the harvester to guard against pile-up of salt at the collector entrance and also to effect desirable crumbling of the cake so that on its eventual discharge from the machine it is in granular rather than chunk form.

When properly set, the blade 52 rides easily on the base and lifts product salt as a more or less continuous cake (FIG. 8) which is accepted by the collector as it moves forward. As the cake enters the collector it is broken into chunks by the rake blades 46 which then drag or push the chunks to discharge onto the take-away conveyor for transfer to transport vehicles (not shown) moving alongside.

Prototype test machines have demonstrated the remarkable efficiency of our process and apparatus; and tests have proved that a one or two man team can harvest up to 1,000 tons of salt per hour.

As shown, the heavy power station 18 is mounted on one side of the frame forward of the wheels while the take-away conveyor 17 is mounted diagonally thereto, i.e. aft of the wheels and extending away from the opposite side of the frame. This arrangement places the center of gravity of the harvester about its longitudinal center line and forward of the wheels where it should be for proper operation.

Offsetting the drawbar as shown with the point of collection closer the uncut salt than to the previously cleaned base provides a special advantage on wider machines or in operation cutting deep cake becaues it places the traction force in line with the resultant forward component.

What is claimed is:

1. Salt harvesting apparatus comprising, a frame including longitudinally extending side members and having a wheeled support, an inclined conveyor having a bottom and sidewalls, transverse rake members mounted to move longitudinally of said conveyor closely adjacent the bottom, means pivotally mounting said conveyor on said frame to enable up and down movement of at least the forward end of said conveyor, an elongated wedge shaped cleavage blade mounted transversely of said conveyor at the forward end thereof with its thin edge forming the lower leading edge of the conveyor and its wide edge extending upwardly from the bottom of the conveyor, and said transverse rake members being arranged to pass closely adjacent said thick edge of said wedge shaped blade for engaging blocks of material passing thereover.

2. Apparatus according to claim 1 in which said wheeled support comprises a pair of wheels rotatably mounted at opposite ends of a support member positioned transverse to said frame, and means for controllably tilting said frame relative to said wheeled support said means comprising a transverse member on said frame, means pivotally connecting said transverse frame member to said support member, and motor means interconnecting said support member and said transverse frame member at locations spaced from said pivotal connection for effecting relative movement between said frame and said wheeled support upon actuation of said motor means.

References Cited by the Examiner

UNITED STATES PATENTS 3,043,030  7/1962  Wisbey _____ 198—7 X
3,126,653  3/1964  Bourgeous _____ 198—7 X EVON C. BLUNK, *Primary Examiner.*

R. J. HICKEY, *Assistant Examiner.*